Patented July 10, 1934

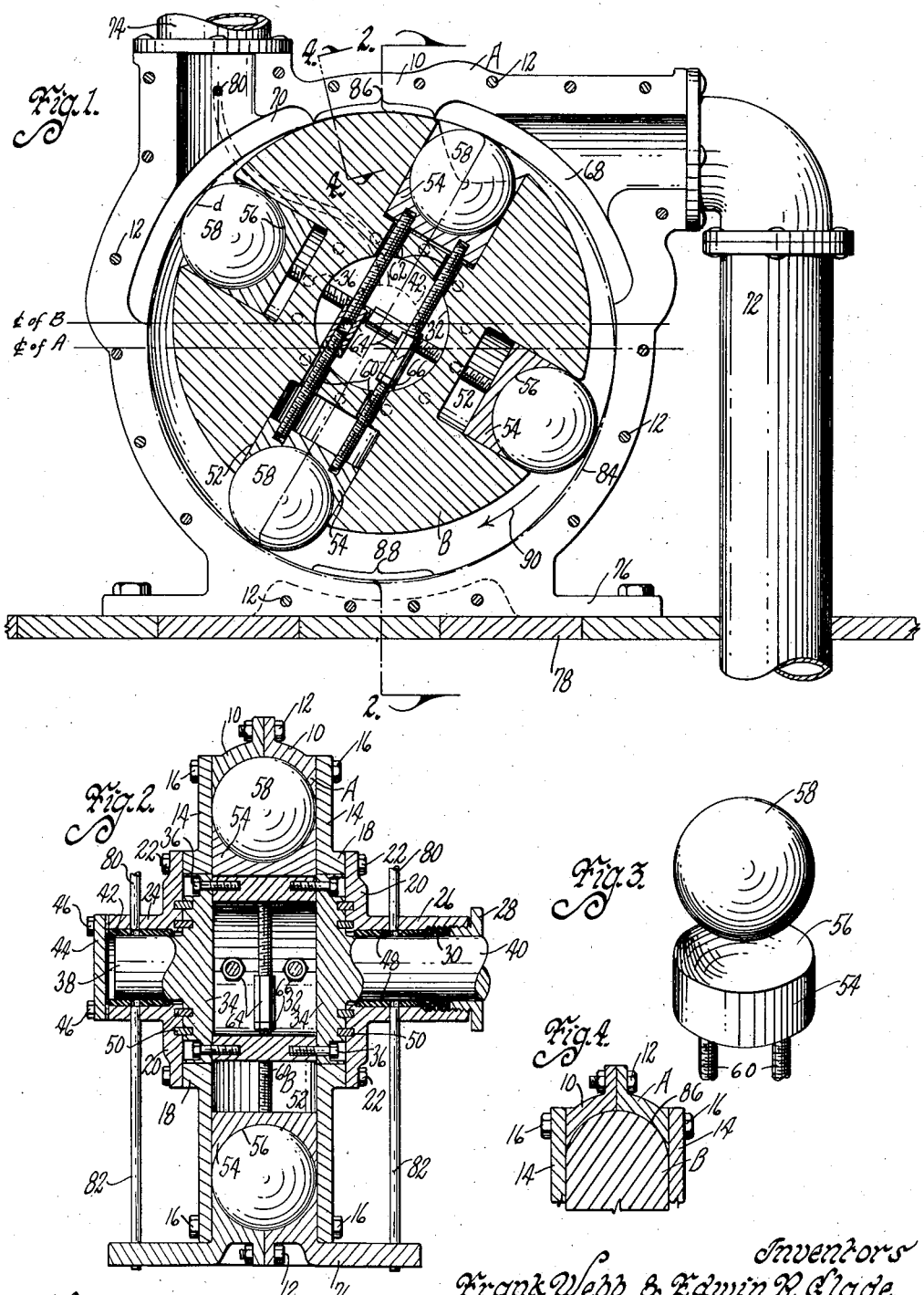

1,965,872

UNITED STATES PATENT OFFICE 1,965,872

ROTARY PUMP OR THE LIKE

Frank Webb and Edwin R. Glade, Fontanelle, Iowa

Application October 9, 1933, Serial No. 692,760

6 Claims. (Cl. 103—137)

An object of our invention is to provide a rotary pump or the like of simple, durable and inexpensive construction having novel features making it adaptable for use as either a pump or fluid pressure engine.

A further object is to provide a pump or the like having a novel sealing means consisting of pockets countersunk in the periphery of a rotor and having hemispherical seats in combination with spherical sealing elements received in said seats and adapted to coact with the internal wall of the stator.

A further object is to provide connections between the cup elements in which the spherical sealing elements are seated, said connections comprising rods having turn buckle connections permitting adjustment to compensate for wear, the rotor having a hollow center for gaining access to the adjusting means.

Another object is to provide sealing means for a rotary pump or the like consisting of sphere-like sealing elements which can revolve rather than slide on the stator, thus reducing friction and wear and providing a pump which can accordingly be operated with less power.

Still a further object is to provide a special construction of rotor involving end plates, the end plates being grooved and the stator also having end plates which are complementarily grooved, the complementary grooves receiving packing rings to prevent the leakage of water or other pumped fluid from the stator casing to the bearings of the device.

With these and other objects in view our invention consists in the construction, arrangement and combination of the various parts of our device, whereby the objects contemplated are attained, as hereinafter more fully set forth, pointed out in our claims, and illustrated in the accompanying drawing, in which:

Figure 1 is a vertical central sectional view through a rotary pump or the like embodying our invention.

Figure 2 is a vertical transverse sectional view on the line 2—2 of Figure 1.

Figure 3 is a perspective view of one of the spherical sealing elements and the cup in which it is seated; and Figure 4 is a sectional view on the line 4—4 of Figure 1.

On the accompanying drawing, we have used the reference character A to indicate generally a stator and B a rotor. The stator A comprises a pair of annular casing members 10 secured together by bolts or the like 12. It further includes primary end plates 14 secured to the casing members 10 by cap screws or the like 16. The primary end plates 14 are provided with off-center hubs 18 to which secondary hub plates 20 are secured by cap screws 22 or the like. Hubs 24 and 26 are formed on the end plates 20. The hub 26 has therein a packing nut 28 and packing 30.

The stator A, or more particularly the elements 10 thereof, are semicircular in cross section, as shown in Figures 2 and 4. The rotor B is likewise semicircular in cross section at its periphery. The rotor B has a central bore 32 and is supported by end plates 34 which cover the bore or hollowed out portion 32. Cap screws or the like 36 are used for securing the rotor end plates 34 in position as illustrated.

The end plates 34 are provided, one with a stub shaft extension 38 and the other with a drive shaft extension 40. The stub shaft extension 38 extends into the hub 24 and is journalled in a bearing 42 therein of hard rubber or similar composition which can be lubricated with water. This, of course, is used when the device is used as a water pump, while if it were used for some other fluid, a different bearing would have to be provided. The hub 24 is covered by a cover plate 44 held in position by cap screws 46. The parts which the securing bolts and cap screws 12, 16, 22 and 46 connect together can have suitable gaskets interposed as found necessary to prevent leakage.

The drive shaft extension 40 extends through a similar bearing 48 in the hub 26. The end plates 34 are provided with grooves and so are the end plates 20, these grooves being complementary and having extending into them packing or sealing rings 50. These rings prevent fluid under pressure from the interior of the pump being forced to the bearings and are especially desirable when water or the like is being pumped and the bearings are of babbitted, roller or ball type instead of the type disclosed.

The rotor B has a plurality of oppositely arranged cylindrical pockets 52. In each pocket 52 is received a cup element 54 having a hemispherical seat 56.

In each hemispherical seat is received a spherical sealing element 58. The elements 58 have the same radius as the interior wall of the stator and the periphery of the rotor.

The opposite cup elements 54 are connected by rods 60 which extend through bores 62 in the rotor as shown in Figure 1. Each pair of opposite cup elements is connected by a pair of rods and each pair of rods is in a plane at right angles to the other pair so that the rods do not interfere with each other, as best shown in Figure 2. The rods 60 are of turn buckle construction, being right and left hand threaded and having turn buckle nuts 64 thereon located in the bore 32 of the rotor. Lock nuts 66 are provided for retaining the adjustment of the turn buckles.

An inlet port 68 and an outlet port 70 are provided in the stator. An inlet pipe 72 connects with the port 68, while an outlet pipe 74 connects with the port 70. The device may be used for pumping any fluid and is preferably provided with mounting feet 76 so that it can be secured to a well cover 78 or the like with the inlet pipe 72 extending down into the well.

For lubricating purposes, we provide lubricating pipes 80 extending from the outlet port 70 to the bearings 42 and 48. These can be copper tubes of very small bore, as a very slight flow of lubricant is sufficient.

Drain pipes 82 are provided to return any surplus of the lubricant into the well. Thus a pump is provided which does not need greasing or oiling when used as a water pump.

The hub 18 of the end plate 14 being off-center causes the rotor to be mounted eccentrically in the stator. The distance between outside surfaces of opposite spheres 58 always remains the same. Therefore the interior of the stator cannot be a true circle. A true circle line is indicated at 84 on the drawing. It will be noted that the actual shape of the stator differs therefrom. Portions 86 and 88 of the stator may be formed on a true radius from the center of the shafts 38 and 40. The portion 86 is sealed by the periphery of the rotor against leakage of water from the port 70 to the port 68.

All parts of the rotor not contacting with the portion 86 are spaced from the interior wall of the stator and sealed by the sealing elements 58. Rotation of the rotor in the direction of the arrow 90 will cause the water or other fluid to be pumped in from the pipe 72 and discharged into the pipe 74.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. In a device of the class described, a rotor having a periphery semicircular in cross section, a stator receiving said rotor eccentrically, said rotor having cylindrical pockets of substantially the same diameter as the thickness of said rotor and countersunk in its periphery, cups slidable in said pockets having hemispherical seats, said cups being of the same diameter as the width of said rotor and spherical sealing elements received in said cups and contacting with said hemispherical seats throughout the surface thereof.

2. In a device of the class described, a rotor having a periphery semicircular in cross section, a stator receiving said rotor eccentrically, said rotor having oppositely arranged cylindrical pockets of substantially the same diameter as the thickness of said rotor and countersunk in its periphery, cups slidable therein having hemispherical seats, said cups being of the same diameter as the width of said rotor connecting rods extending between opposite cups and spherical sealing elements received in said cups and contacting with said hemispherical seats throughout the surface thereof.

3. In a device of the class described, a rotor having a periphery semicircular in cross section, a stator receiving said rotor eccentrically, said rotor having oppositely arranged cylindrical pockets countersunk in its periphery, said pockets being of the same width as the distance between the side of said stator, cups of the same width as said rotor and slidable in said pockets having hemispherical seats, connecting rods extending between opposite cups and spherical sealing elements received in said cups, each connecting rod including a turn buckle for adjusting the length of the connecting rod and thereby the distance across opposite spherical sealing elements.

4. In a device of the class described, a rotor having a periphery semicircular in cross section, a stator receiving said rotor eccentrically, said rotor having oppositely arranged cylindrical pockets countersunk in its periphery, cups slidable therein having hemispherical seats, each of said cups being of a diameter substantially equal to the width of said rotor, connecting rods extending between opposite cups and spherical sealing elements received in said cups, each connecting rod including a turn buckle for adjusting the length of the connecting rod and thereby the distance across opposite spherical sealing elements, said rotor being hollow to facilitate gaining access to said turn buckles.

5. In a device of the class described, a rotor having a periphery semicircular in cross section, a stator receiving said rotor eccentrically, said rotor having oppositely arranged cylindrical pockets countersunk in its periphery, and of the same diameter as the distance between the sides of said stator, cups slidable therein, spanning the distance between the sides of said stator and having hemispherical seats, spherical sealing elements received in said cups and means for retaining said spherical sealing elements against the interior wall of said stator.

6. In a device of the class described, a rotor having a periphery semicircular in cross section, a stator receiving said rotor eccentrically, said rotor having oppositely arranged cylindrical pockets countersunk in its periphery, cups slidable therein having hemispherical seats, connecting rods extending between opposite cups and spherical sealing elements received in said cups, each connecting rod including a turn buckle for adjusting the length of the connecting rod and thereby the distance across opposite spherical sealing elements, said rotor being hollow to facilitate gaining access to said turn buckles, said rotor having bores for said rods to extend through from the cups to the hollow portion of the rotor and said cups being of the same diameter as the width of said rotor.

FRANK WEBB.
EDWIN R. GLADE.